Jan. 11, 1927. 1,614,391
A. J. RATH
METHOD AND APPARATUS FOR MACHINING SPIRAL TOOTH GEARS
Filed Sept. 27, 1924 4 Sheets-Sheet 1

Fig. 1.

Inventor
Albert Joseph Rath,
By _____ atty.

Jan. 11, 1927. 1,614,391
A. J. RATH
METHOD AND APPARATUS FOR MACHINING SPIRAL TOOTH GEARS
Filed Sept. 27, 1924 4 Sheets-Sheet 3

Inventor
Albert Joseph Rath

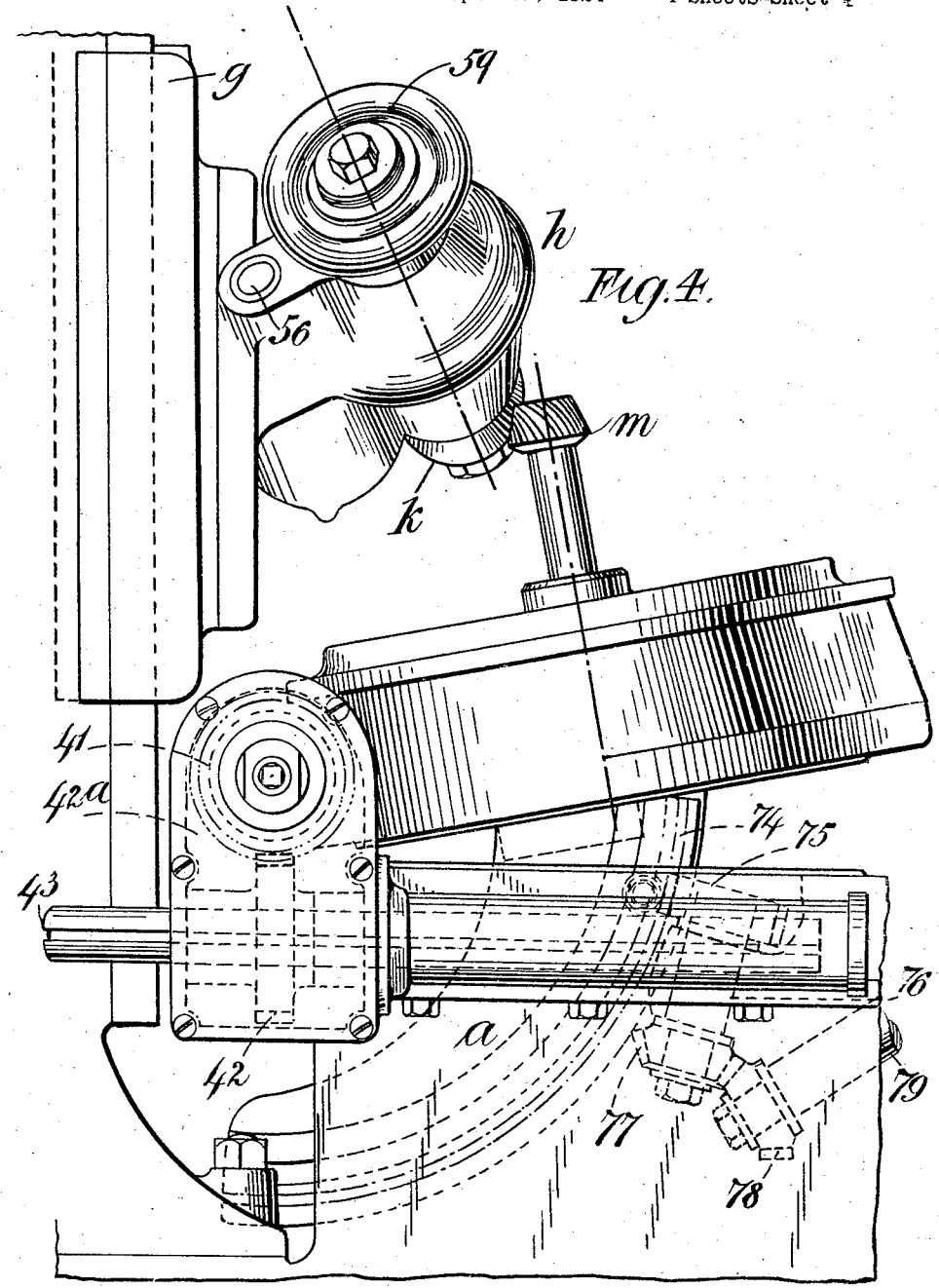

Patented Jan. 11, 1927.

1,614,391

UNITED STATES PATENT OFFICE.

ALBERT JOSEPH RATH, OF ACTON, LONDON, ENGLAND, ASSIGNOR OF FOUR-FIFTEENTHS TO GWYNNES LIMITED AND FOUR-FIFTEENTHS TO GWYNNES ENGINEERING COMPANY LIMITED, BOTH OF LONDON, ENGLAND, AND TWO-FIFTEENTHS TO WILLIAM CANNELL, OF OXFORD, ENGLAND.

METHOD AND APPARATUS FOR MACHINING SPIRAL-TOOTH GEARS.

Application filed September 27, 1924, Serial No. 740,325, and in Great Britain October 1, 1923.

This invention relates to method of and apparatus for the production of spiral tooth cuts in gear blanks and particularly for the performance of initial or roughing cuts in gear blanks. The advantages of this invention are notably achieved in the roughing of the blanks of spiral bevel gears or crown wheels.

The principal object of this invention is to enable the cutting of spiral gears to be effected with accuracy in the shortest possible time and with great efficiency, regard being had for the simplicity and durability of the structure of the machine.

A further object is to carry a revoluble milling tool upon a reciprocatable cutter head and a revoluble work table upon a reciprocatory saddle or slide, timed mechanisms being provided for reciprocating the saddle or slide during the intervals between cutting periods and for driving the cutter head along its cutting stroke and meanwhile revolving the work so as to produce the spiral cut, the work table being further revolved after withdrawal of the work from the tool in order to index the work ready for a fresh cut. In the indexing of the work, it is advantageous to bring to the position for cutting the tooth next but one to that which has been last cut, so that the intermittent turning of the work table is always in the same direction.

A further object is to support the spindle of the revolving cutter at a peculiar angle in relation to the axis of the work and to enable the cutter spindle to be angularly adjustable in the cutter head, and in this way the cutter may be made to run with clearance in the spiral cut or groove produced as aforesaid.

It is desirable that the cutter should travel over the tooth face of the blank and no more, because in a spiral bevel with constant lead the angle of the path constantly changes. Therefore, the shorter the path of the tool, the nearer will the cutter cut to its shape. Yet another object, therefore, is to enable the reciprocatory path of the cutter to be as short as possible and to achieve this by causing the commencement of the cut to be accomplished to tooth depth by the feeding in of the work table whilst the cutter head is stationary at the commencement of its cutting stroke. The simultaneous feed of the tool and revolution of the work succeeds this initial cutting and produces a spiral cut of tooth depth, whereupon the work is withdrawn and indexed and the cutter is returned to the starting position.

A further object of the invention is to enable the revoluble work table to be supported at any desired angle to the horizontal and nevertheless to enable the drive for revolving said table to be applied undisturbed by any such angular adjustment.

A detailed description may now be given of a cycle of operations constituting an advantageous mode of operation in accordance with these improvements. Let it be assumed that the cutter has been brought to the position for commencement of a cut and that the blank has been indexed correctly. The said cycle is commenced by the saddle moving towards the cutter and feeding the work thereto. During the concluding portion of this feed-in motion of the saddle the cutter is engaged between the end portions of two adjacent teeth and, due to the feed-in motion of the saddle, cuts the opposed faces of these teeth from tip to root. Thereupon, the feed-in motion of the saddle ceases and the cutter head commences the downward or cutting stroke; also, the work table commences to revolve. Owing to the stroke of the cutter and revolution of the work, the cutter performs a spiral cut between the teeth aforesaid and cuts the faces thereof from the upper end to the lower end. As soon as this cut is finished, the stroke of the cutter head ceases and the revolution of the work table is arrested, whereupon the saddle carrying the work table is returned at high speed for removing the work from the vicinity of the cutter. As the work table is withdrawn (or when it is withdrawn) the high speed drive also operates upon the cutter head mechanism, for returning the cutter head to the initial position, and upon the indexing mechanism for revolving the work to the extent required to bring, say, the next tooth space but one into position for cutting the adjacent teeth. The high speed drive is then cut out, so that the low speed drive again becomes operative, and this may happen at the commencement of the feed-in motion of the saddle carrying the work table or at a suitable moment during the said feed-in, whereupon the work table is given a proper approach to the cutter and a fresh cycle is commenced and performed in the manner above described. In a practical machine it is advantageous to provide what may be termed a timing shaft. This name may be adopted conveniently because this shaft may carry (a) a cam for the timed operation of mechanism for reciprocating the saddle carrying the work table (b) a gapped transmission gear for interrupting the drives of the cutter head and revolving table when the withdrawal of the work is about to take place, and (c) a cam for the timed control of the high speed and low speed drives. The timing shaft may be adapted for receiving the two drives, and an element of the low speed drive may comprise an overrunning clutch or free wheel so that it is merely over-run when the high speed drive comes into operation and therefore need not be actually cut out. It is convenient to reciprocate the cutter head through the medium of mechanism comprising a cam-operated toothed rack operating another toothed rack on the cutter head through a change gearing, this arrangement enabling the speed of the cutting stroke to be adjusted readily to suit requirements. The milling cutter is driven continuously and the transmission thereto preferably comprises a change gear capable of giving speed variation in either the forward or reverse direction seeing that the speed of the cutter has to be changed for different kinds of work and the direction of revolution has to be changed in the event of the position in relation to the work having to be reversed. The work table mechanism conveniently comprises toothed quadrant gearing and a hand wheel for enabling the work to be set at the desired angle in relation to the cutter. The saddle of the table is suitably provided with manually operated means for disconnecting the table saddle and withdrawing it so that the table is removed to a distance from the cutter when the blank has been roughed or machined and a fresh blank is to be mounted on the table.

In order to enable the invention to be readily understood, reference is made to the accompanying drawing, illustrating one suitable construction embodying all the present improvements, in which drawing:—

Figure 1 is a perspective view of the various mechanism and parts constituting the said machine and it will be understood that this view has been devised as a pictorial aid to an understanding of a description of the operative character of the machine without strict regard to the accurate showing of the mechanical details and real relative dispositions of the parts.

Figure 4 is a side elevation of Figure 3, and

Figure 2:
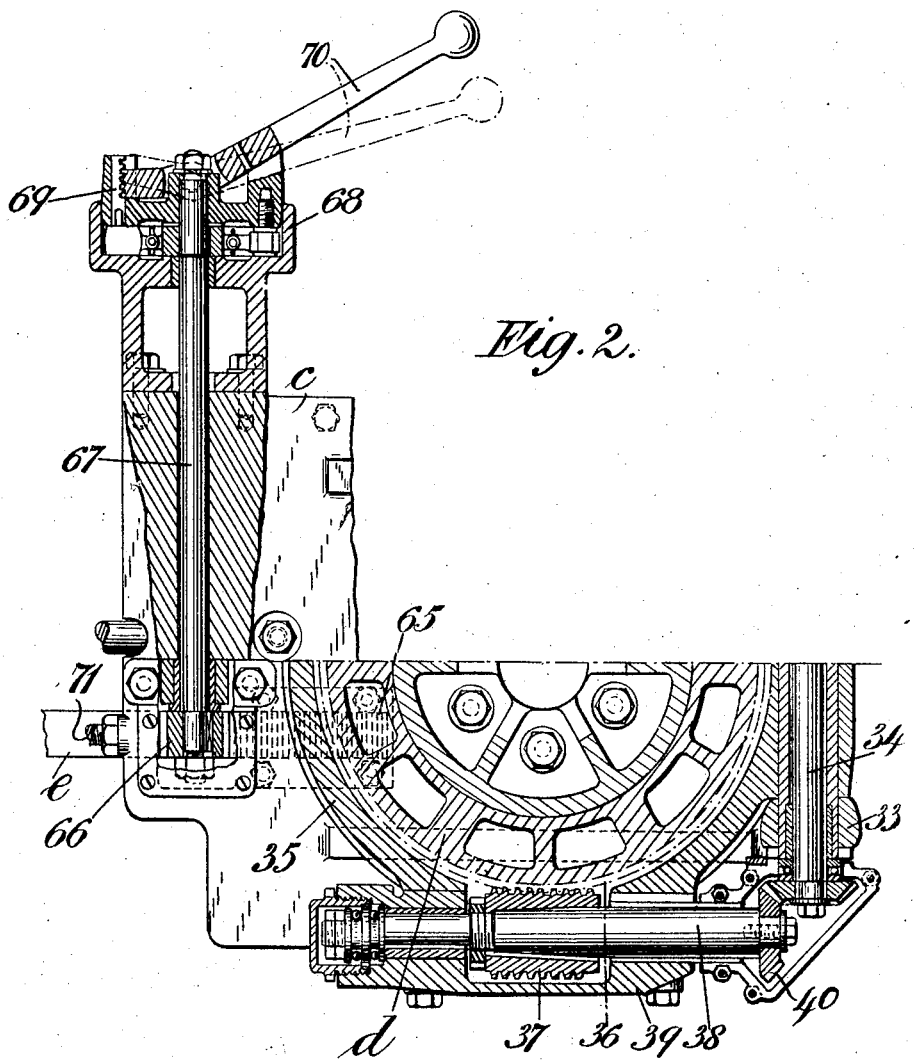
Figure 2 is a sectional plan of the work table and its support, including a manually operated mechanism for effecting an extended withdrawal of such table when the dismounting of a finished work blank and the mounting of a fresh one is to be performed.

Referring to Figure 1 of the drawing, $a$ is the framing of the machine furnished with horizontal guides $b$ for a slidable saddle $c$, a work table $d$ being revolubly supported upon the slidable saddle $c$ as hereinafter described. The framing $a$ is also furnished with vertical guides $f$ for a saddle $g$ carrying the cutter head $h$ the latter comprising bearings for supporting the cutter spindle $j$ upon which the revoluble tool such as a milling cutter $k$ is fixed. The cutter head $h$ is revolubly adjustable in a circular guide $l$ around the axis $l'$ and is secured in any position to which it is adjusted by a clamping bolt not shown. It may here be noted that the cutter spindle $j$ is supported so that it inclines a little outwardly away from the saddle $g$ towards the end on which the cutter $k$ is fixed, thereby giving the cutter a favourable angle in relation to the spiral teeth on the work blank $m$. The angularity will be hereinafter more fully described.

A main shaft $n$ mounted in the frame is fitted with a belt pulley $o$ and any suitable means may be adopted for controlling the driving thereof. The shaft $n$ is fitted with three gears, namely, (a) a spur wheel $p$ for driving a change and reversible gear indicated as a whole at $q$ through which the cutter spindle $j$ is driven as hereinafter described. (b) a pinion $r$ meshing with a pinion $s$ which drives through a change gear $t$ a worm spindle $u$ from which the slow speed drive is obtained, and (c) a skew gear wheel $v$ meshing with a skew gear wheel $w$ on an intermediate shaft $x$ which may be called the high speed drive shaft.

A shaft $y$, called a timing shaft for a reason already explained, has fitted on it: (a) a worm wheel $z$ meshing with the worm $l$ of the worm spindle $u$, this worm wheel $z$ engaging the shaft $y$ through a free wheel clutch in the hub 2 of such wheel. A detail showing of this clutch is not necessary as any suitable ratchet or free wheel device can be used for the purpose of providing only one-way engagement between the worm wheel $z$ and its shaft $y$. (b) a drum 3 formed with a cam groove 4 engaged by an arm 5 on a rock shaft 6, the latter having a crank arm 7 connected by a rod 8 with a crank arm 9 on a spindle 10 carrying a toothed quadrant 11 in mesh with downwardly directed rack teeth 12 on a rack bar e connected with the work table saddle c in a manner hereinafter described, (c) an interrupted toothed wheel 13, being a toothed wheel with two gaps 14, 15 in its series of teeth for a purpose to be explained. It may here be noted that the wheel 13 may have wide teeth and that the gaps 14 and 15 are then formed in only one half of the width of the teeth, or the wheel 13 with gaps in its series of teeth may be fixedly connected with a second wheel 13ª having no gaps in its series of teeth. The uninterrupted series of teeth of the wheel 13ª is in mesh with a pinion 16 normally free on the shaft x but capable of being clutched thereto, (d) cam disc 17 provided with a face cam 18 for operating a clutch lever 19 controlling the high speed drive through the shaft x and with an edge cam 20 for controlling a stop latch lever 21 for engaging as hereinafter explained, with a transmission wheel 22 meshing with the interrupted gear wheel 13.

The transmission wheel 22 is keyed upon a transmission shaft 23 upon which is keyed a bevel gear 24 in mesh with a bevel gear 25 on the lower end of a vertical shaft 26 from which the drive for revolving the work table is taken. Upon the shaft 23 also are keyed cam devices 27, 28 for operating a vertically reciprocatable bar 29 formed at its upper end with rack teeth 30 for operating a train of change gear 31 for driving a shaft 31ª having a pinion 31ᵇ in operative engagement with a rack 32 on the saddle g of the cutter head.

The reciprocatory work table saddle c has at its forward end lugs or projections 33 forming bearings for a transverse spindle 34 (see also Figure 2), which also constitutes a hinge or pivot connection for a frame 35 in which the circular work table d is revolubly mounted. The circular table d is formed or provided with peripheral worm teeth 36 which are engaged by a worm 37 on a spindle 38 mounted in bearings 39 along one side of the frame 35 and in driving connection with the transverse spindle 34 through the medium of bevel gearing 40. The end of the transverse spindle 34 on the opposite side of the saddle c is fitted with a skew gear 41 in mesh with a skew gear 42 feathered on a shaft 43 extending alongside the saddle c, and this shaft 43 is driven through a change gear train 44 which is driven by the vertical shaft 26 the latter being geared with the transmission shaft 23 as above described. The skew gear 42 is carried on the shaft 43 between bearings in a gear box 42ª Figure 4 fixed to the saddle c. Thus, the mechanism just described is adapted for revolving the work table d in any position to which the frame 35 may be adjusted about its hinge of pivot spindle 34 and during the whole traverse of the saddle c along its guides b.

A description of the operation of the mechanism above described will now be given including reference to such further details as are necessary for a clear understanding. It will be assumed that the feed-in motion has brought the work table d up to the cutter head and that the upper ends of the opposed faces of two adjacent teeth of the work blank m are about to make contact with the milling tool k. At this point in the cycle the main shaft n is driving the timing shaft y through the medium of the gears r, s, the change gear t, the worm spindle u and worm 1 thereon, the worm wheel z and the free wheel clutch in the hub 2 thereof. The timing shaft y at this time is not driving the transmission shaft 23 because a gap 15 in the teeth of the wheel 13 is at the point of mesh with the gear wheel 22 on the transmission shaft 23. It will be noticed from Figure 1 that gaps are formed also in the series of teeth on the wheel 22 but these gaps are merely for clearance to prevent fouling as the teeth of the wheel 13 again come into mesh after a gap passes. So long as the gap 15 is at the point of mesh, the cutter head g remains stationary and the work table d does not revolve. However, the cam drum 3 on the timing shaft y is set so that at this time its groove 4 operates the arm 5 for causing (through the rod 8) the quadrant 11 to turn and finish the feed-in motion of the rack e, saddle c and work table d, this concluding portion of the feed-in motion being effective for causing the tool k to cut from tip to root at the upper end of the teeth aforesaid of the work blank m. The cam groove 4 now ceases to feed in the work table saddle c and the gap 15 of the wheel 13 passes the point of mesh, so that teeth of the wheel 13 now enter into mesh with the teeth of the gear wheel 22 and drive the transmission shaft 23. Therefore, one of the cams 27, 28 on the shaft 23 is now operative for engaging with the vertical rack bar 29 and causing the cutter head saddle g to descend through the medium of the gearing 30, 31, 32 above described. At the same time, the vertical shaft 26 is driven by the transmission shaft 23 and causes the work table d to be revolved through the medium of the gearing 44, shaft 43, skew gearing 42, 41, shaft 34, bevel gearing 40, worm 37 and worm wheel 36. The simultaneous descent of the tool k and revolution of the work table d are so calculated relatively as to produce the cutting of the desired spiral in the blank m. When the cutter head saddle g has descended sufficiently for the cutter k to reach the end of its cut, although the tool k may still be to a certain extent between the teeth upon which it has been operating, the second gap 14 in the teeth of the interrupted tooth wheel 13 arrives at the point of mesh so that driving of the transmission shaft 23 again ceases. At this moment, also, an appropriate portion of the groove 4 in the cam drum 3 comes into operation and, through the medium of the rod 8 and quadrant 11, causes the work table saddle $c$ to recede and withdraw the work table and work blank $m$ from the cutter $k$. Simultaneously, the face cam 18 of the disc 17 on the timing shaft $y$ permits the lever arm 19 to be moved leftwardly under the action of a spring 45 and to close a clutch 46 whereby the small pinion 16 becomes clutched to the shaft $x$ and drives the wheel $13^a$ and shaft $y$ at a higher speed than the shaft $y$ is driven by the worm 1 and worm wheel $z$. Thus, for the withdrawal of the work, the timing shaft $y$ is driven at a high speed, the free wheel clutch in the hub 2 of the worm wheel $z$ permitting the shaft $y$ to over-run the slowly driven worm wheel $z$ thereon. The withdrawal of the work having been effected, the gap 14 passes the point of mesh and the gear teeth 13 again come into mesh with the wheel 22 for driving the transmission shaft 23, the high speed drive through shaft $x$ and pinion 16 still being operative. Thus, the work blank $m$ is revolved at quick speed for indexing it, owing to the table $d$ being revolved through the gearing driven by the vertical shaft 26 as aforesaid, and the cutter head $g$ is elevated and brought into its initial position at the same quick speed through the gearing driven by the cam-driven bar 29 as aforesaid. The gap 15 in the teeth 13 now comes to the point of mesh so that the movement of the cutter head $g$ and the revolution of the work table $d$ cease. Then an appropriate portion of the cam groove 4 in the drum 3 operates to effect the feed-in motion of the work table saddle $c$ and at a suitable instant the face cam 18 opens the clutch 46 of the small pinion 16 so that the timing shaft $y$ is again driven by the slowly revolving worm wheel $z$ and a fresh cycle is commenced. As it is important to prevent turning of the gear wheel 22 on the transmission shaft 23 during such periods as the gaps 14 and 15 of the interrupted teeth 13 arrive at and pass over the point of mesh, a latch lever 21 is adapted for latching with notches 47 in a disc 48 formed on or attached to the gear wheel 22. As will be understood, this latch lever 21 is operated at the correct moment by the suitable disposed lobes or projections of the edge cam 20 on the timing shaft $y$, as will be apparent from Figure 1. A suitably arranged spring may be provided for lifting the nose of the latch out of a notch 47 when permitted to do so by the cam 20 as will be readily understood.

For the continuous driving of the cutter $k$ and cutter spindle $j$ the saddle $g$ on which the cutter head $h$ is revolubly mounted as aforesaid is provided with a bearing for a short spindle 49 having a bevel gear 50 on one end and a bevel gear 51 on the other end. The axis of this spindle 49 coincides with the axis $l'$ of revoluble adjustment of the cutter head $h$ on its saddle $g$. The bevel gear 51 meshes with a bevel gear 52 feathered on a vertical transmission shaft 53 and a sleeve or hub of this feathered bevel gear 52 is journalled in a bearing boss projecting from the saddle $g$ so that the gear 52 is carried along with the saddle $g$ when the latter slides up or down. The vertical transmission shaft 53 is driven through bevel gearing $53^a$ by a counter shaft $n'$ geared with the main shaft $n$ through the change speed and reversible gear $q$. The bevel gear 50 meshes with a bevel gear 54 on an inclined shaft 55 which is parallel with the tool spindle $j$, a wide tooth pinion 56 on the shaft 55 meshing with a gear wheel 57 on the tool spindle $j$. The cutter head $h$ is provided not only with running bearings for the tool spindle $j$ but also with a ball thrust bearing, the casing of this thrust bearing being adjustably screwed into a screw threaded sleeve part 58 of the cutter head $h$ and capable of adjustment by a hand wheel 59 for the setting of the cutter $k$ prior to taking a cut, and the wide tooth pinion 56 permitting of this adjustment without losing mesh with the gear 57.

The weight of the saddle $g$ and cutter head $h$ is conveniently balanced by means of a counterweight 60 and a flexible connection 61 running over a pulley 62 and in the example illustrated both the up and down motions of the saddle $g$ are produced by cam operation of the rack bar 29, the cam 28 engaging the anti-friction roller 63 for the up motion and the cam 27 engaging the roller 64 for the down motion. However, other mechanisms may be employed for producing the up and down motion of the saddle $g$.

In order that the reciprocatory motion of the saddle $c$, carrying the work table may be readily varied, the arm 9 is slotted and a scale is provided along the slot as shown. Thus, the point of pivotal connection of the rod 8 with the arm 9 can be shifted for producing different throws of the arm 9, as will be readily understood. In order that the work table $d$ may be readily removed from the neighbourhood of the cutter $k$ when a blank $m$ has been roughed out and a fresh blank is to be mounted on the table $d$, the rack bar $e$ is formed with upwardly directed rack teeth 65 meshing with a pinion 66 on a spindle 67 revoluble in bearings on the saddle $c$. The latter has fixed to it a hollow brake drum 68 and the spindle 67 has a brake-operating member 69 actuated by a lever 70 which also acts as a crank handle for turning the pinion 66 and causing the saddle c to be moved to and fro along the guides b. Normally, the brake is engaged, as shown in Figure 2, with the brake drum 68 so that the pinion 66 cannot roll along the rack 65 and in this way the saddle c is fixedly connected with the rack bar e. Upon pushing the handle 70 inwards to the chain line position seen in Figure 2, the brake-operating member 69 is released, so that upon turning the handle 70 the pinion 66 is caused to roll along the rack teeth 65 and the saddle c with the work table d is moved away from the tool k, the said saddle moving in relation to the rack bar e which is held stationary by the lever arm 9 and connecting rod 8. To ensure the return of the saddle c and table d to the proper position, the saddle c has a rod 71 fixed thereto and the rack bar e has a perforated projection 72 acting as a guide for the rod 71 and as an abutment stop for an adjustable stop nut 73 on the end of the rod 71. Consequently, in the reverse turning of the handle 70, the saddle c is returned along its guides until the stop nut 73 engages the projection 72, whereupon the handle 70 is moved outwardly so that the brake device is re-engaged with the brake drum 68, to prevent the pinion 66 from rolling upon the rack teeth 65. In this way, the saddle is recoupled with the rack bar e so that when the machine is again put in motion and the bar e is reciprocated by the quadrant 11, the saddle c will partake of such reciprocation in accordance with the cycle of operations hereinbefore described.

For the purpose of enabling the table d to be tilted about the pivot shaft 34 for the purpose of adjusting the angularity of the work m in relation to the tool k, the table support 35 is provided with a quadrantal rack 74 with which meshes a worm 75 on a vertical shaft 76 revolubly mounted in bearings in the saddle c. At the lower end of the shaft 76 there is keyed a bevel wheel 77 which is in mesh with a bevel wheel 78 on the lower end of a hand wheel shaft 79.

Figure 3:
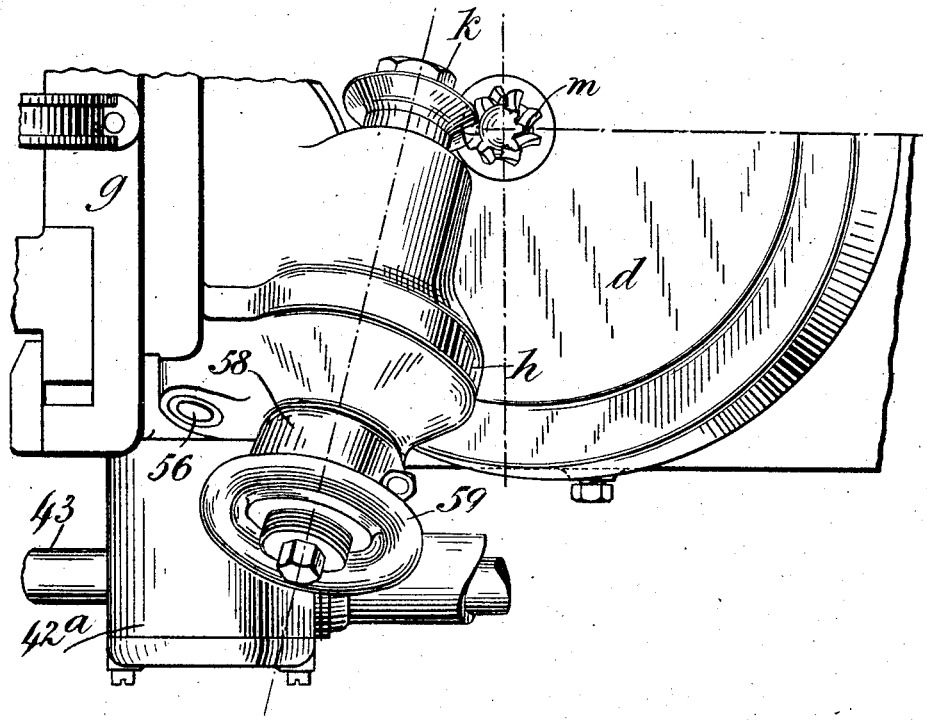
Figure 3 is a plan view showing the relation between the cutter and the work table.
Figure 5:
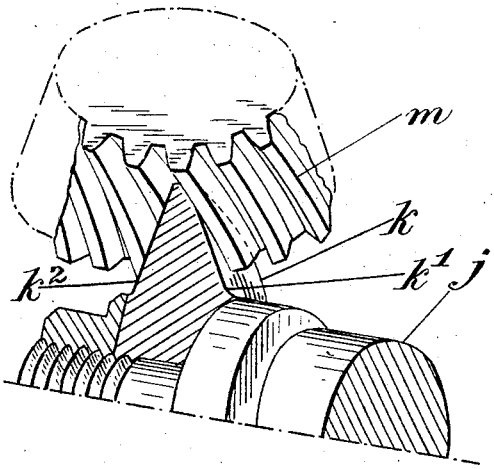
Figure 5 is a perspective view showing the cutter in the act of making a cut.

In a machine adapted for the cutting of a spiral bevel tooth, it is important to employ a formation and disposition of revolving cutting tool, such as a milling cutter, capable of giving a highly efficient result. Referring to Figure 4, it will be seen that the work m must be supported at such an angle as will cause a spiral cut to be made when the work revolves and the tool k simultaneously moves rectilinearly. Inasmuch as the tool k has to traverse a spiral groove between two teeth, it is clear that one side of the cutter will be cutting against a convex face whereas the opposite side of the cutter will be cutting against a concave face. In traversing the spiral groove, moreover, it must not be possible for the revolving cutter to foul the groove or to enlarge the groove beyond what is determined by the cross section of the cutter. Now, by setting the cutter at a suitable angle so that it inclines over the convex face, as will be understood by comparing Figures 4 and 5, and by forming the cutting edges on that side (the side $k'$ Figure 5) which engages the concave face with a substantially greater degree of bevel than the cutting edges on that side (the side $k^2$) which engages the convex face, it is found that ample clearance is obtained on both sides of the cutter. Also, by properly correlating the angular disposition of the cutter and the relative degrees of bevelling on the two sides, the opposed faces of two adjacent teeth are cut or roughed to the desired formation so that they are in the most advantageous condition for the subsequent machining in the finishing machine. The angular disposition of the cutter will be understood by comparing Figures 3 and 4, in which it will be seen that the cutter spindle is not only inclined outwardly away from the cutter head but is also inclined downwardly, thereby obtaining the favourable angle above described, the effect of which will be understood from Figure 5. The revolving cutter appears in the drawings as a disc tool, which it might be if it were a grinding tool. However, a milling tool is usually employed and the tool illustrated is to be understood as being a milling tool.

I claim:

1. Method of cutting spiral teeth in bevel gear blanks, consisting in supporting the blank with a generator of the cone of the bevel parallel with the rectilinear path of a rotating cutter carried by a reciprocatory slide, intermittently reciprocating said cutter with a stroke sufficient for reciprocating it over the bevel face and no more, intermittently feeding the gear blank up to the cutter while the slide of the latter is stationary at the end of a stroke and to an extent sufficient for starting a cut of tooth depth, then simultaneously rotating the blank about its proper axis and feeding said cutter slide along its cutting stroke, then withdrawing the work and returning the cutter slide and finally indexing the work by rotating the blank in the same direction as before, the rotation of the blank whether for cutting or for indexing being always in one and the same direction as set forth.

2. Machine for cutting spiral teeth in gear blanks comprising in combination a rotating cutter, a reciprocatory head rotatably supporting said cutter, a rotatable work table, a slide rotatably supporting said table, timed mechanism operative for reciprocating said slide during intervals between cutting periods for withdrawing the work from the cutter and returning it thereto, timed cam mechanism operative for driving the cutter head along the cutting stroke and for returning said head, and timed mechanism operative for producing uni-directional rotation of the work table (a) during the cutting stroke for producing the spiral cut and (b) after withdrawal of the work from the tool for indexing the work.

3. Machine for cutting spiral teeth in gear blanks comprising in combination a rotating cutter, a reciprocatory head rotatably supporting said cutter, a rotatable work table, a slide rotatably supporting said table, timed mechanism operative for reciprocating said slide during intervals between cutting periods for withdrawing the work from the cutter and returning it thereto, timed cam mechanism operative for driving the cutter head along the cutting stroke and for returning said head, a timed mechanism operative for producing uni-directional rotation of the work table (a) during the cutting stroke for producing the spiral cut and (b) after withdrawal of the work from the tool for indexing the work, a timing shaft common to all of said timed mechanisms, a slow speed drive comprising an over-running device in operative connection with said timing shaft, a high speed drive for said timing shaft, and a clutch under timed control for the cutting in and out of said high speed drive.

4. Machine for cutting spiral teeth in gear blanks, comprising in combination a rotating cutter, a reciprocatory head rotatably supporting said cutter, a rotatable work table, a slide rotatably supporting said table, timed mechanism comprising an adjustable ratio transmission element operative for reciprocating said slide during intervals between cutting periods for withdrawing the work from the cutter and returning it thereto, timed cam mechanism operative for driving the cutter head along the cutting stroke and for returning said head, and timed mechanism operative for producing uni-directional rotation of the work table (a) during the cutting stroke for producing the spiral cut and (b) after withdrawal of the work from the tool for indexing the work.

5. Machine for cutting spiral teeth in gear blanks comprising in combination a rotating cutter, a reciprocatory head rotatably supporting said cutter, a rotatable work table, a slide rotatably supporting said table, timed mechanism comprising an adjustable ratio transmission element operative for reciprocating said slide during intervals between cutting periods for withdrawing the work from the cutter and returning it thereto, disconnectible coupling means between said slide and said element, timed cam mechanism operative for driving the cutter head along the cutting stroke and for returning said head, and timed mechanism operative for producing uni-directional rotation of the work table (a) during the cutting stroke for producing the spiral cut and (b) after withdrawal of the work from the tool for indexing the work.

6. Machine for cutting spiral teeth in gear blanks comprising in combination a rotating cutter, a reciprocatory head rotatably supporting said cutter, a revoluble work table, a slide rotatably supporting said table, timed mechanism comprising an adjustable ratio transmission element operative for reciprocating said slide during intervals between cutting periods for withdrawing the work from the cutter and returning it thereto, disconnectible coupling means between the slide and said element, relatively adjustable stop devices adapted for ensuring the re-coupling of said slide and transmission element in a predetermined relation after any uncoupling operation, timed cam mechanism operative for driving the cutter head along the cutting stroke and for returning said head, and timed mechanism operative for producing uni-directional rotation of the work table (a) during the cutting stroke for producing the spiral cut and (b) after withdrawal of the work from the tool for indexing the work.

7. Machine for cutting spiral teeth in gear blanks comprising in combination a rotating cutter, a reciprocatory head rotatably supporting said cutter, a rotatable work table, a slide rotatably supporting said table, a timing shaft, a low speed drive for said shaft comprising an overrunning device, a high speed drive for said shaft, a clutch for said high speed drive, an automatically operated control for said clutch, a cam-operated transmission between said shaft and said slide for reciprocating the latter, during intervals between cutting periods, an intermediate shaft, gapped transmission gears between said timing and intermediate shafts, a transmission for the reciprocation of said cutter head, said transmission comprising cams on said intermediate shaft, and a toothed gear transmission between said intermediate shaft and said rotatable table.

8. Machine for cutting spiral teeth in gear blanks comprising in combination a rotating cutter, a reciprocatory head rotatably supporting said cutter, a rotatable work table, a slide rotatably supporting said table, a timing shaft, a low speed drive for said shaft comprising an overrunning device, a high speed drive for said shaft, a clutch for said high speed drive, an automatically operated control for said clutch, a cam-operated transmission between said shaft and said slide for reciprocating the latter during intervals between cutting periods, an intermediate shaft, gapped transmission gears between said timing and intermediate shafts, locking means automatically operative for locking said intermediate shaft during idle periods due to the said gaps, a transmission for the reciprocation of said cutter head, said transmission comprising cams on said intermediate shaft, and a toothed gear transmission between said intermediate shaft and said rotatable table.

9. Machine for cutting spiral teeth in gear blanks comprising in combination a rotating cutter, a reciprocatory head rotatably supporting said cutter, a rotatable work table, a slide rotatably supporting said table, a timing shaft having driving connections operative to reciprocate said head, revolve said table and reciprocate said slide, a low speed drive for said shaft comprising an overrunning device, a high speed drive for said shaft, clutch mechanism for said high speed drive, a face cam on said timing shaft for the timed control of said clutch mechanism, a cam drum on said timing shaft, an adjustable ratio transmission linkage operative between said cam drum and said slide for reciprocating said slide during intervals between cutting periods for withdrawing the work from the cutter and returning it thereto, an intermediate shaft, gapped transmission gears between said intermediate and timing shafts, cams on said intermediate shaft, a transmission mechanism in operative connection between the last-named cams and the reciprocatory cutter head, and transmission gearing between said intermediate shaft and said rotatable table.

10. Machine for cutting spiral teeth in gear blanks comprising in combination a rotating cutter, a reciprocatory head rotatably supporting said cutter, a rotatable work table, a slide rotatably supporting said table, timed mechanism comprising an adjustable ratio transmission element operative for reciprocating said slide during intervals between cutting periods for withdrawing the work from the cutter and returning it thereto, releasable shift mechanism forming a normally rigid connection between said slide and said timed mechanism, said shift mechanism being releasable and operable manually for extreme withdrawals of said table without disturbing said timed mechanism, timed mechanism operative for driving the cutter head along the cutting stroke and for returning said head, and timed mechanism for producing uni-directional rotation of the work table (a) during the cutting stroke for producing the spiral cut and (b) after withdrawal of the work from the tool for indexing the work.

11. Machine for cutting spiral teeth in gear blanks comprising a reciprocatory cutter head, vertical slideways therefor, a spindle supported in bearings in said head, a rotatable disc cutter mounted on said spindle, said spindle being inclined in a direction outwardly and downwardly away from said cutter head and towards the work, a reciprocatory slider, horizontal slideways therefor, a rotatable work support on said slider, said support being adapted for carrying a bevel gear blank with its axis inclined to the vertical, and timed mechanism for operating said slider reciprocating said cutter head and rotating said work support.

ALBERT JOSEPH RATH.